(12) United States Patent
Wang

(10) Patent No.: US 12,337,916 B2
(45) Date of Patent: Jun. 24, 2025

(54) METHOD OF CONTROLLING STATE OF ELECTRIC ASSIST BICYCLE, CONTROL SYSTEM, AND ELECTRONIC DEVICE

(71) Applicant: FOXCONN INTERCONNECT TECHNOLOGY LIMITED, Grand Cayman (KY)

(72) Inventor: Chien-Wen Wang, New Taipei (TW)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 40 days.

(21) Appl. No.: 18/211,341

(22) Filed: Jun. 19, 2023

(65) Prior Publication Data

US 2024/0199157 A1 Jun. 20, 2024

(30) Foreign Application Priority Data

Dec. 16, 2022 (CN) .......................... 202211627869.X

(51) Int. Cl.
*B62H 5/00* (2006.01)
*B62J 50/22* (2020.01)
*B62M 6/45* (2010.01)

(52) U.S. Cl.
CPC ................ *B62H 5/00* (2013.01); *B62J 50/22* (2020.02); *B62M 6/45* (2013.01)

(58) Field of Classification Search
None
See application file for complete search history.

(56) References Cited

U.S. PATENT DOCUMENTS

| 6,882,315 | B2 * | 4/2005 | Richley ..................... G01S 5/06 |
| | | | 342/465 |
| 11,377,071 | B2 | 7/2022 | Wall et al. |
| 2018/0103414 | A1 | 4/2018 | Golsch |
| 2022/0001836 | A1 * | 1/2022 | Baek ...................... G01S 13/878 |
| 2024/0199157 | A1 * | 6/2024 | Wang ....................... B62J 50/22 |
| 2024/0214208 | A1 * | 6/2024 | Herman ................ G06F 21/602 |
| 2024/0402285 | A1 * | 12/2024 | Yao .......................... G01S 5/145 |

FOREIGN PATENT DOCUMENTS

| CN | 205632870 U | 10/2016 | |
| WO | WO-2022007944 A1 * | 1/2022 | .............. G01S 11/06 |
| WO | WO-2025025954 A1 * | 2/2025 | |

* cited by examiner

*Primary Examiner* — Carlos Garcia
(74) *Attorney, Agent, or Firm* — ScienBiziP, P.C.

(57) ABSTRACT

A method of controlling state of electric assist bicycle is provided. The method obtains position information of a target user. The method generates a state switching instruction according to the position information of the target user. The method controls the electric assist bicycle to switch from an unlocking state to a locking state according to the state switching instruction or controlling the electric assist bicycle to switch from the locking state to the unlocking state according to the state switching instruction. A related control device and a related control system are provided.

14 Claims, 9 Drawing Sheets

METHOD OF CONTROLLING STATE OF ELECTRIC ASSIST BICYCLE, CONTROL SYSTEM, AND ELECTRONIC DEVICE

FIELD

The subject matter herein generally relates to a mobile vehicle technology, and particularly to a method of controlling state of electric assist bicycle, a control system, and an electronic device.

BACKGROUND

To avoid an appearing of a safety hazard situation of an electric assist bicycle, for example, a losing of the electric assist bicycle, or the electric assist bicycle being used by a user who is not authorized to use the electric assist bicycle, the electric assist bicycle needs to be locked. Usually, the electric assist bicycle can add a mechanical lock or an electronic lock, thus the electric assist bicycle can be controlled to be in an unlocking state or in a locking state automatically. However, due to an adding of a lock to a vehicle frame of the electric assist bicycle, an occupied space in the electric assist bicycle is increased, a cost of the electric assist bicycle is increased, moreover, a locking or an unlocking of the electric assist bicycle needs an operation of the user, and the electric assist bicycle cannot be unlocked or locked automatically when a target user approaches the electric assist bicycle.

SUMMARY

An embodiment of the present application provides a method of controlling state of electric assist bicycle, a control device, and a control system capable of automatically achieving an locking or an unlocking of the electric assist bicycle without the electronic lock or the mechanical lock. Thus, the number of the mechanism pieces of the electric assist bicycle can be reduced, and a weight of the electric assist bicycle can be accurately controlled.

In a first aspect, an embodiment of the present application provides a method of controlling state of electric assist bicycle. The method obtains position information of a target user. The method generates a state switching instruction according to the position information of the target user. The method controls the electric assist bicycle to switch from the unlocking state to the locking state according to the state switching instruction or controlling the electric assist bicycle to switch from the locking state to the unlocking state according to the state switching instruction.

Therefore, the method can obtain the position information of the target user, generate the state switching instruction according to the position information, and control the electric assist bicycle to switch from the unlocking state to the locking state or from the locking state to the unlocking state according to the state switching instruction. The electric assist bicycle can automatically unlock according to the position information of the target user, it is convenient for the target user to use the electric assist bicycle, and the electric assist bicycle can automatically lock according to the position information of the target user, thus a safety hazard situation of the electric assist bicycle can be avoided. Simultaneously, an electric lock and a mechanical lock are not needed, thus the number of the mechanism pieces of the electric assist bicycle can be reduced, and a weight of the electric assist bicycle can be accurately controlled.

According to some embodiments of the present application, the method obtains the position information of the target user transmitted by an UWB (Ultra Wide Band) unit of the electric assist bicycle.

Therefore, the method utilizes the position information of the target user obtained by the UWB unit of the electric assist bicycle, thus the position information is not easy to be interfered by the one or more obstacles, the positioning is accordingly more accurate.

According to some embodiments of the present application, the position information is provided with a distance between the target user and the electric assist bicycle. The method generates an unlocking instruction when the distance between the target user and the electric assist bicycle is within a preset range, and generates a locking instruction when the distance between the target user and the electric assist bicycle is out of the preset range.

According to some embodiments of the present application, the method controls one or more function control units of the electric assist bicycle to switch from a waking state to be in a standby state or a shutdown state according to the locking instruction, to cause the electric assist bicycle to switch from the unlocking state to the locking state.

Therefore, when the distance between the target user and the electric assist bicycle is out of the preset range, and/or an orientation of the target user relative to the electric assist bicycle is out of the preset range, the locking instruction is generated to control the function control units to be standby or shutdown. Thus, the electric assist bicycle switches from the unlocking state to the locking state. Thus, locking the electric assist bicycle manually is not needed, a losing of the electric assist bicycle and a usage by the user who is not authorized are avoided, and the safety hazard situation can be decreased.

According to some embodiments of the present application, the method controls one or more function control units of the electric assist bicycle to switch from a standby state or a shutdown state to be in a waking state according to the unlocking instruction, to cause the electric assist bicycle to switch from the locking state to the unlocking state. Thus, when the distance between the target user and the electric assist bicycle is within the preset range, and/or the orientation of the target user relative to the electric assist bicycle is within the preset range, the unlocking instruction can be generated to control the function control units to be waked, thus the electric assist bicycle switches from the locking state to the unlocking state. Unlocking the electric assist bicycle manually is not needed, thus it is convenient for the user to use.

According to some embodiments of the present application, before obtaining the position information of the target user, the method further obtains identification information of the user transmitted by a BLE (Bluetooth® Low Energy) unit of the electric assist bicycle, authenticates whether the user is the target user according to the identification information, wakes the UWB unit of the electric assist bicycle if the user is authenticated to be the target user.

Therefore, the method obtains identification information of the user transmitted by a BLE unit of the electric assist bicycle, and wakes the UWB unit of the electric assist bicycle if the user is authenticated to be the target user. The method can obtain the position information timely, and avoid the electric consumption of the UWB unit when the UWB unit is waked at any moment, thus a bad user experience can be avoided.

In a second aspect, an embodiment of the present application provides a control system of electric assist bicycle.

The control system includes a control device. The control device is configured to obtain position information of a target user, generate a state switching instruction according to the position information of the target user, and control the electric assist bicycle to switch from the unlocking state to the locking state according to the state switching instruction or control the electric assist bicycle to switch from the locking state to the unlocking state according to the state switching instruction.

Therefore, the control device can obtain the position information of the target user, generate the state switching instruction according to the position information, and control the electric assist bicycle to switch from the unlocking state to the locking state or from the locking state to the unlocking state according to the state switching instruction. The electric assist bicycle can automatically unlock according to the position information of the target user, it is convenient for the target user to use the electric assist bicycle, and the electric assist bicycle can automatically lock according to the position information of the target user, thus a safety hazard situation of the electric assist bicycle can be avoided. Simultaneously, an electric lock and a mechanical lock are not needed, thus the number of the mechanism pieces of the electric assist bicycle can be reduced, and a weight of the electric assist bicycle can be accurately controlled.

According to some embodiments of the present application, the control system obtains the position information of the target user transmitted by an UWB unit of the electric assist bicycle.

Therefore, the control device utilizes the position information of the target user obtained by the UWB unit of the electric assist bicycle, thus the position information is not easy to be interfered by the one or more obstacles, the positioning is accordingly more accurate.

According to some embodiments of the present application, the position information includes a distance between the target user and the electric assist bicycle. The control device is further configured to generate an unlocking instruction when the distance between the target user and the electric assist bicycle is within a preset range, and generate a locking instruction when the distance between the target user and the electric assist bicycle is out of the preset range.

According to some embodiments of the present application, the control device controls one or more function control units of the electric assist bicycle to switch from a waking state to be in a standby state or a shutdown state according to the locking instruction, to cause the electric assist bicycle to switch from the unlocking state to the locking state. Or the control device controls one or more function control units of the electric assist bicycle to switch from the standby state or the shutdown state to be in the waking state according to the unlocking instruction, to cause the electric assist bicycle to switch from the locking state to the unlocking state.

Therefore, when the distance between the target user and the electric assist bicycle is out of the preset range, and/or the orientation of the target user relative to the electric assist bicycle is out of the preset range, the locking instruction is generated to control the function control units to be standby or shutdown. Thus, the electric assist bicycle switches from the unlocking state to the locking state. Thus, locking the electric assist bicycle manually is not needed, a losing of the electric assist bicycle and a usage by the user who is not authorized are avoided, and the safety hazard situation can be decreased. Simultaneously, when the distance between the target user and the electric assist bicycle is within the preset range, and/or the orientation of the target user relative to the electric assist bicycle is within the preset range, the unlocking instruction can be generated to control the function control units to be waked, thus the electric assist bicycle switches from the locking state to the unlocking state. Unlocking the electric assist bicycle manually is not needed, thus it is convenient for the user to use.

According to some embodiments of the present application, the control device is further configured to obtains identification information of the user transmitted by a BLE unit of the electric assist bicycle, authenticates whether the user is the target user according to the identification information, wakes the UWB unit of the electric assist bicycle if the user is authenticated to be the target user.

Therefore, the control device obtains identification information of the user transmitted by a BLE unit of the electric assist bicycle, and wakes the UWB unit of the electric assist bicycle if the user is authenticated to be the target user. The control device can obtain the position information timely, and avoid the electric consumption of the UWB unit when the UWB unit is waked at any moment, thus a bad user experience can be avoided.

According to some embodiments of the present application, the control system further includes a cycle computer display. The cycle computer display is configured to determine the position information of the target user, and transmit the position information of the target user to the control device. The cycle computer display and/or the control device is installed on a handlebar of the electric assist bicycle.

Therefore, when the cycle computer display and/or the control device is installed on the handlebar, the obstacles on the handlebar are less, the control device and/or the cycle computer display each is not easy to be interfered by the one or more obstacles when the control device and/or the cycle computer display each receives the signal transmitted by a device supporting the UWB. Thus, a more accurate position information of the target user can be calculated.

In a third aspect, an embodiment of the present application provides a control device. The control device includes a storage device and at least one processor. The storage device stores one or more programs, which when executed by the at least one processor, cause the at least one processor to obtain position information of a target user. The control device further causes the at least one processor to generate a state switching instruction according to the position information of the target user. The control device further causes the at least one processor to control the electric assist bicycle to switch from the unlocking state to the locking state according to the state switching instruction or controlling the electric assist bicycle to switch from the locking state to the unlocking state according to the state switching instruction.

In a fourth aspect, an embodiment of the present application provides a storage medium. The storage medium stores a computer program code. When the computer program code is run on a control device, the control device is enabled to perform the method of controlling state of electric assist bicycle.

The method of controlling state of electric assist bicycle, the control system, the control device, and the storage medium can obtain the position information of the target user, generate the state switching instruction according to the position information, and control the electric assist bicycle to switch from the unlocking state to the locking state or from the locking state to the unlocking state according to the state switching instruction. The electric assist bicycle can automatically unlock according to the position information of the target user, it is convenient for the target user to use the electric assist bicycle, and the electric assist bicycle can automatically lock according to the position information of the target user, thus a safety hazard situation of the electric assist bicycle can be avoided. Simultaneously, an electric lock and a mechanical lock are not needed, thus the number of the mechanism pieces of the electric assist bicycle can be reduced, and a weight of the electric assist bicycle can be accurately controlled.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
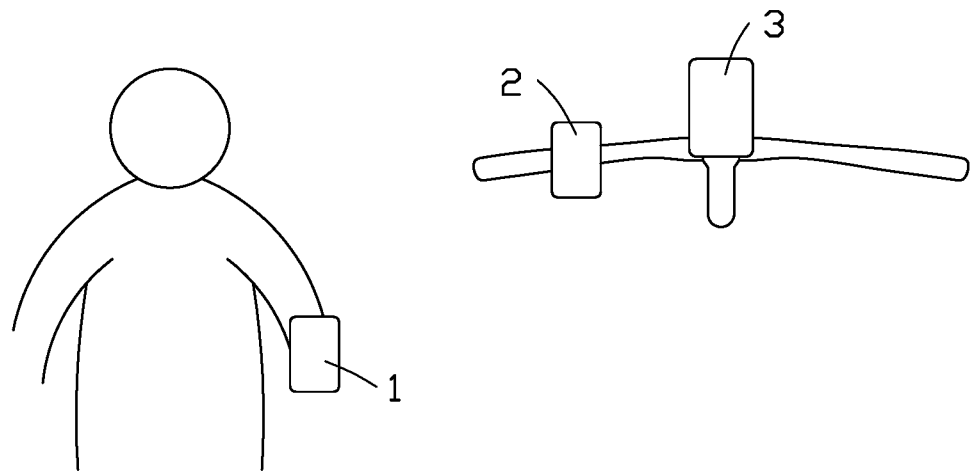
FIG. 1 is an application scenario view of an embodiment of a control device.

For clarity, of illustration of objectives, features and advantages of the present disclosure, the drawings combined with the detailed description illustrate the embodiments of the present disclosure hereinafter. It is noted that embodiments of the present disclosure and features of the embodiments can be combined, when there is no conflict.

Various details are described in the following descriptions for better understanding of the present disclosure, however, the present disclosure may also be implemented in other ways other than those described herein. The scope of the present disclosure is not to be limited by the specific embodiments disclosed below.

Unless defined otherwise, all technical and scientific terms used herein have the same meaning as commonly understood by one of ordinary skill in the art to which the present disclosure belongs. The terms used herein in the present disclosure are only for the purpose of describing specific embodiments, and are not intended to limit the present disclosure. The term "coupled" in the disclosure includes a wired connection or a wireless connection.

In order to precisely illustrate the technical solutions of the present disclosure, and in order to precisely understand the present disclosure, the term used in the disclosure will be described or defined before illustrating the detail description.

UWB is a safety ranging and positioning techniques based on an impulse radio. UWB can utilize ToF (Time of flight) to safely and accurately calculate a relative position between or among the devices supporting the UWB. In detail, when a number of UWB devices approaches each other, UWB devices can utilize ToF to measure a communication round trip time. Thus, a device can immediately and continuously calculate the relative position with another device, and an update rate of a measuring result is 100 times per second, namely the position of the devices on both sides can be immediately monitored in real time. A spectrum of the UWB is from 3.1 GHz to 10.6 GHz, a channel bandwidth of the UWB is as high as 500 MHz, and a pulse of the UWB is as short as 2 ns.

A control device of an electric assist bicycle is configured to be operated by the user to control the electric assist bicycle to perform a corresponding function. For example, the user can utilize the control device of the electric assist bicycle to control a size of an assist power of the electric assist bicycle, to adjust a light mode of a vehicle lamp, to adjust a range of a transmission, to switch an interface on a display terminal of the electric assist bicycle, and so on. The display terminal can be a digital display, a mobile terminal, and so on. The control device of the electric assist bicycle can be hereinafter referred to as the control device in the following description.

A cycle computer display is configured to display information of the electric assist bicycle and information of the user. The cycle computer display is further configured to display an operation signal by the user. The cycle computer display can be added to the electric assist bicycle according to the need.

A condition in the related art will be brief described below.

To avoid an appearing of a safety hazard situation of an electric assist bicycle, for example a losing of the electric assist bicycle, or the electric assist bicycle being used by a user who is not authorized to use the electric assist bicycle, the electric assist bicycle needs to be locked. Usually, after a mechanical lock is added to the electric assist bicycle, a physical key can be utilized to open or close the mechanical lock. Thus, the electric assist bicycle can be in a locking state or in an unlocking state. Or, after an electronic lock is added to the electric assist bicycle, the electronic lock can utilize a Bluetooth wireless communication technology to couple to a mobile phone on which an APP (Application) for unlocking the electronic lock is installed. The mobile phone can open or close the electronic lock via the APP. Or, a device which utilizes a near field communication technology and on which a virtual key is installed can be obtained. After the device touch the electronic lock, the electronic lock opens or closes. Thus, the electric assist bicycle can be in the unlocking state or the locking state. However, when the mobile phone opens or closes the electronic clock by the APP, due to an easiness of the Bluetooth signal to be affected and a bad accuracy of position information of the electronic lock received by the mobile phone, the electronic lock cannot be immediately and accurately open or closed. When the electronic lock is open or closed via the near field communication technology, the device on which the virtual key is installed needs to directly contact the electronic lock. Now, for three manners to unlock or lock the electric assist bicycle, a lock needs to be added to a vehicle frame of the electric assist bicycle, thus an occupied space in the electric assist bicycle is increased, a cost of the electric assist bicycle is increased, moreover a locking or an unlocking of the electric assist bicycle needs an operation of the user, and the electric assist bicycle cannot be unlocked or locked automatically when a target user approaches the electric assist bicycle.

Thus, the disclose provides a method of controlling state of electric assist bicycle, a control system, an electronic device, and a storage medium capable of automatically achieving a locking or an unlocking of the electric assist bicycle without the electronic lock or the mechanical lock. Thus, the number of the mechanism pieces of the electric assist bicycle can be reduced, and a weight of the electric assist bicycle can be accurately controlled.

Referring to FIG. 1, an application scenario view of a control device is shown. It can be understood that, the control device can be also referred to the electronic device. The electric assist bicycle can include an UWB unit. The UWB unit can be integrated into the control device 2 or the cycle computer display 3. When a target user carrying a device 1 supporting the UWB approaches the electric assist bicycle, the UWB unit of the electric assist bicycle can continuously calculate position information of the target user, and transmit the position information of the target user to the control device 2. Thus, the control device 2 can control the electric assist bicycle to switch from the unlocking state to the locking state or from the locking state to the unlocking state according to the position information.

Figure 2:
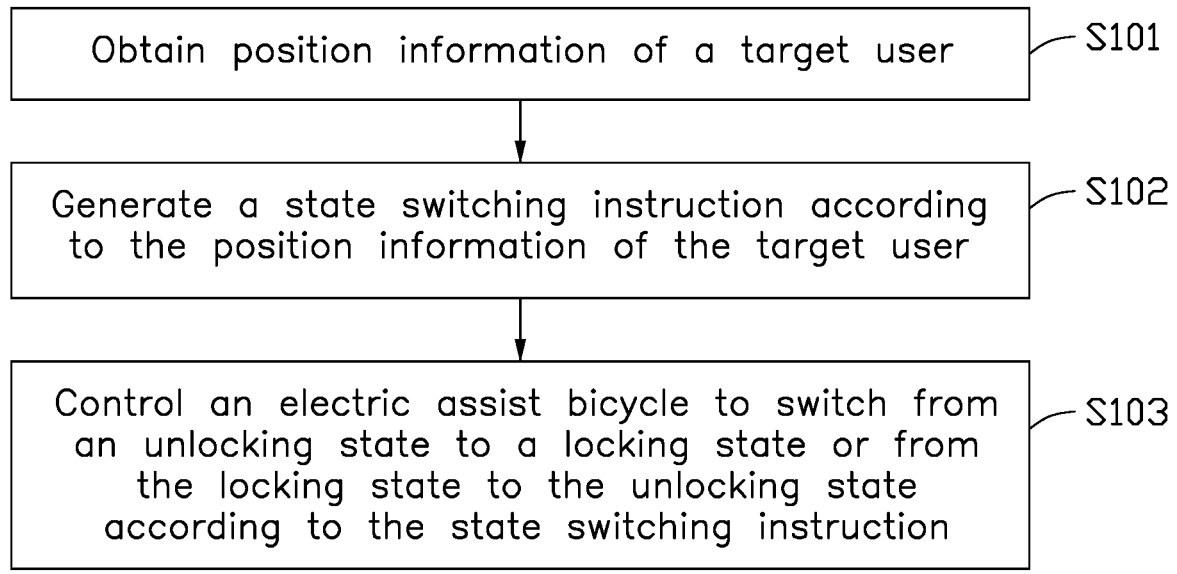
FIG. 2 is a flowchart of an embodiment of a method of controlling state of electric assist bicycle.

Referring also to FIG. 2, a flowchart of a method of controlling state of electric assist bicycle is shown. The method can be applied on the control device. The method includes:

Step S101, obtaining position information of a target user.

The target user can be a user posing a usage right of the electric assist bicycle and carrying a device supporting the positioning function, for example carrying the device 1 supporting the UWB. It can be understood that, the device supporting the positioning function can be other devices, for example, a device supporting a Wi-Fi® (Wireless Fidelity®), a device supporting a BLE, or a device supporting a NFC (Near Field Communication), the disclosure is not limited herein. The electric assist bicycle can include the control device and a positioning unit capable of receiving the position information of the target user. The positioning unit can include a Wi-Fi unit, a BLE unit, a NFC unit, or a UWB unit. When the target user carries the device 1 supporting the UWB approaches the electric assist bicycle, the positioning unit of the electric assist bicycle can continuously calculate the position information of the target user, and transmit the position information of the target user to the control device 2. The device 1 supporting the UWB can include a smart phone, a wearable device, a key, a target, or a door lock.

Step S102, generating a state switching instruction according to the position information of the target user.

The state switching instruction includes an unlocking instruction and a locking instruction. The unlocking instruction can be configured to switch a state of the electric assist bicycle from the locking state to the unlocking state. The locking instruction can be configured to switch the state of the electric assist bicycle from the unlocking state to the locking state. The unlocking state of the electric assist bicycle is that each unit of the electric assist bicycle is in a waking state, thus each unit can immediately response to the operation of the user. The locking state of the electric assist bicycle is that each unit of the electric assist bicycle is in a standby state or a shutdown state, namely when the user operates each unit, the user needs to wait for a waking of each unit, and each unit cannot immediately response to the operation of the user. Each unit of the electric assist bicycle includes the electric assist bicycle its own units, for example includes a battery, a power control unit, a transmission, a motor, a current sensor of the motor, and so on. Each unit of the electric assist bicycle further includes one or more units coupling to the electric assist bicycle via a physical wire link or a wireless link, for example includes a control device, a digital display, a mobile terminal, a vehicle lamp, and so on.

After the control device 2 obtains the position information of the target user via the positioning unit, the control device 2 can generate a first instruction to switch the state of the electric assist bicycle from the unlocking state to the locking state, or generate a second instruction to switch the state of the electric assist bicycle from the locking state to the unlocking state.

Step S103, controlling the electric assist bicycle to switch from the unlocking state to the locking state or from the locking state to the unlocking state according to the state switching instruction.

The control device 2 can transmit the unlocking instruction to each unit of the electric assist bicycle, and each unit can accordingly switch from the standby state or the shutdown state to the waking state. Thus, the electric assist bicycle can switch from the locking state to the unlocking state. The control device 2 can transmit the locking instruction to each unit of the electric assist bicycle, each unit accordingly switches from the waking state to the standby state or the shutdown state, thus the electric assist bicycle can switch from the unlocking state to the locking state.

In an application scenario, the electric assist bicycle is in the locking state, the target user carrying the device 1 supporting the UWB approaches the electric assist bicycle including the positioning unit, the positioning unit can transmit the obtained position information to the control device 2, thus the control device 2 generates the unlocking instruction according to the position information, and transmits the unlocking instruction to one or more function control units of the electric assist bicycle, to cause each unit to be in the waking state. Thus, the electric assist bicycle can be controlled to be unlocked. The one or more function control units are the units capable of performing various functions of the electric assist bicycle, namely each unit of the electric assist bicycle in the step S102.

In an application scenario, the electric assist bicycle is in the unlocking state, the target user carrying the device 1 supporting the UWB moves away from the electric assist bicycle including the positioning unit, the positioning unit can transmit the obtained position information to the control device 2, thus the control device 2 generates the locking instruction according to the position information, and transmits the locking instruction to the one or more function control units of the electric assist bicycle, to cause each unit to be in the standby state or the shutdown state. Thus, the electric assist bicycle can be controlled to be locked.

It can be understood that, after the positioning unit calculates the position information of the target user, the positioning unit transmits the position information to the control device 2. The control device 2 generates the state switching instruction according to the position information, and controls the electric assist bicycle to switch from the unlocking state to the locking state or from the locking state to the unlocking state according to the state switching instruction. The electric assist bicycle can be automatically unlocked according to the position information of the target user, thus it is convenient for the target user to use the electric assist bicycle. The electric assist bicycle can be automatically locked according to the position information of the target user, thus a losing of the electric assist bicycle can be avoided. Simultaneously, the electric lock and the mechanical lock are not needed, thus the number of the mechanism pieces of the electric assist bicycle can be reduced, and the weight of the electric assist bicycle can be accurately controlled.

Therefore, the method can obtain the position information of the target user, generates the state switching instruction according to the position information, and controls the electric assist bicycle to switch from the unlocking state to the locking state or from the locking state to the unlocking state according to the state switching instruction. The electric assist bicycle can be automatically unlocked according to the position information of the target user, it is convenient for the target user to use the electric assist bicycle. The electric assist bicycle can be automatically locked according to the position information of the target user, thus a safety hazard situation of the electric assist bicycle can be avoided. Simultaneously, the electric lock and the mechanical lock are not needed, thus the number of the mechanism pieces of the electric assist bicycle can be reduced, and the weight of the electric assist bicycle can be accurately controlled.

In some embodiments, the positioning unit can be the UWB unit.

When the target user carrying the device 1 supporting the UWB unit approaches the electric assist bicycle, the UWB unit of the electric assist bicycle can continuously calculate the position information of the target user, and transmit the position information of the target user to the control device 2.

It can be understood that, to calculate the distance and the position between the devices, a first manner can be employed. The first manner is employing the Wi-Fi unit, the BLE unit, and/or the NFC unit to receive RSSI (Received Signal Strength Indication) to determine the signal strength, and calculating the distance and the position between the devices according to the signal strength. However, the first manner is easy to be relay attacked by a remote user who is not authorized, thus the calculating may be inaccurately. A second manner employing the UWB unit can be employed to calculate the distance and the position between the devices. The second manner can detect whether the device emitting ToF is an adjacent device to avoid a relay attack, thus the calculated distance and position between the devices are accurate. Simultaneously, the RSSI positioning unit is easy to be affected by one or more obstacles, thus the received signal strength is attenuated, and the RSSI positioning unit is sensitized to the multipath, thus an accuracy of the positioning may be lowed. Due to characteristics of a high channel bandwidth of the UWB and a short pulse of the UWB, the positioning via the UWB unit can maintain a low latency (<10 ms) and a high efficiency in the presence of the multipath. Simultaneously, a ToF measure manner of the UWB unit is not easy to be interfered by the one or more obstacles, thus the positioning is more accurate. Due to the spectrum of the UWB being from the 3.1 GHz to the 10.6 GHz, which is far away from 2.4 GHz used by the other units, thus the UWB can cooperate with the Wi-Fi (Wireless Fidelity) unit, the Bluetooth unit, and the NFC (Near Field Communication) unit, and is not easy to be interfered.

Thus, the information of the target user obtained via the UWB unit of the electric assist bicycle is not easy to be interfered by the one or more obstacles, thus the positioning is more accurate.

In some embodiments, the position information includes a distance between the target user and the electric assist bicycle and/or an orientation of the target user relative to the electric assist bicycle.

The UWB unit can measure any orientation among 360 degrees orientations centered on the UWB unit and can simultaneously measure a range from the UWB unit as the origin to a depth from 1 cm to 10 cm. The measure accuracy of the UWB unit can reach to about 1 cm. A developer can set a range for detecting the target user according to the need. Namely, when the target user enters into a preset range, the target user can be detected by the UWB unit of the electric assist bicycle.

In some embodiments, the step S102 can further include:

Step S201, generating the unlocking instruction when the distance is within the preset range.

When the position information represents that the distance between the target user and the UWB unit of the electric assist bicycle is within a first preset range, and/or the position information further represents that the orientation of the target user relative to the electric assist bicycle is within a second preset range, the control device 2 can generate the unlocking instruction according to the position information. The first preset range can be, for example 1m, 1.2 m, or 1.5 m. The second preset range can be, for example, with a preset certain orientation of the UWB unit as a base line, a range rotated clockwise or anticlockwise about the base line from 0 degrees to 160 degrees or from 0 degrees to 180 degrees.

The function control units are the units capable of performing various functions of the electric assist bicycle, namely each unit of the electric assist bicycle in the step S102.

Step S202, controlling the function control unit of the electric assist bicycle to be in the waking state according to the unlocking instruction, to cause the electric assist bicycle to switch from the locking state to the unlocking state.

For example, the method can transmit the unlocking instruction to the battery, the power control unit, the transmission, the motor, the current sensor of the motor, the control device 2, the digital display, the mobile terminal, and the vehicle lamp, to cause the function control units to be in the waking state.

In an application scenario, the control device 2 can transmit the generated unlocking instruction to one or more subunits of the control device 2. The subunits of the control device 2 are accordingly waked. The subunits of the control device 2 includes an input unit, a storage unit, and a communication unit. Thus, when the target user enters into the preset range, the target user can directly operate the control device 2, to perform corresponding functions of the electric assist bicycle.

In an application scenario, the control device 2 transmits the generated unlocking instruction to the power control unit, the power control unit can be accordingly waked, thus the power control unit can control the motor and the current sensor of the motor to be waked. Thus, when the target user enters into the preset range, the target user can directly ride the electric assist bicycle forward.

It can be understood that, when the distance between the target user and the electric assist bicycle is within the first preset range, and/or the orientation of the target user relative to the electric assist bicycle is within the second preset range, the control device 2 can generate the unlocking instruction to control the function control units to be waked, thus the electric assist bicycle switches from the locking state to the unlocking state. Unlocking the electric assist bicycle manually is not needed, thus it is convenient for the user to use.

Thus, when the distance between the target user and the electric assist bicycle is within the first preset range, and/or the orientation of the target user relative to the electric assist bicycle is within the second preset range, the control device 2 can generate the unlocking instruction to control the function control units to be waked, thus the electric assist bicycle switches from the locking state to the unlocking state. Unlocking the electric assist bicycle manually is not needed, thus it is convenient for the user to use.

In some embodiments, the step S102 can further include:

Step S301, generating the locking instruction when the orientation and the distance is out of the preset range.

When the position information represents that the distance between the target user and the UWB unit of the electric assist bicycle is out of the first preset range, and/or the position information represents that the orientation of the target user relative to the electric assist bicycle is out of the second preset range, the control device 2 can generate the locking instruction according to the position information. The first preset range can be, for example 1m, 1.2 m, or 1.5 m. The second preset range can be, for example with the certain orientation of the preset UWB unit as the base line, the range rotated clockwise or anticlockwise about the base line from 0 degrees to 160 degrees, or from 0 degrees to 180 degrees.

Step S302, controlling the function control units of the electric assist bicycle to be in the standby state or the shutdown state according to the locking instruction, to control the electric assist bicycle to switch from the unlocking state to the locking state.

For example, the method can transmit the locking instruction to the battery, the power control unit, the transmission, the motor, the current sensor of the motor, the control device 2, the digital display, the mobile terminal, and the vehicle lamp, to cause the function control units to be in the standby state or the shutdown state.

In some embodiments, the control device 2 can transmit the generated locking instruction to the subunits of the control device 2. The subunits of the control device 2 can be accordingly in the standby state or in the shutdown state. The subunits of the control device 2 includes the input unit, the storage unit, and the communication unit. Thus, when the target user moves out of the preset range, the control device 2 cannot response to the operation of the target user, thus the electric assist bicycle is controlled to be in the locking state.

In some embodiments, the control device 2 transmits the generated locking instruction to the power control unit, the power control unit can be accordingly in the standby state or in the shutdown state, thus the power control unit controls the motor and the current sensor of the motor to be in the standby state or in the shutdown state. Thus, when the target user moves out of the preset range, the target user cannot directly ride the electric assist bicycle forward. Thus, the electric assist bicycle is controlled to be in the locking state.

It can be understood that, when the distance between the target user and the electric assist bicycle is out of the first preset range, and/or the orientation of the target user relative to the electric assist bicycle is out of the second preset range, the control device 2 can generate the locking instruction to control the function control units to be in the standby state or in the shutdown state. Thus, the electric assist bicycle switches from the unlocking state to the locking state. Locking the electric assist bicycle manually is not needed, thus a losing of the electric assist bicycle and a usage of the electric assist bicycle by the user who is not authorized are avoided, therefore the safety hazard situation can be decreased.

Thus, when the distance between the target user and the electric assist bicycle is out of the first preset range, and/or the orientation of the target user relative to the electric assist bicycle is out of the second preset range, the control device 2 can generate the locking instruction to control the function control units to be in the standby state or in the shutdown state. Thus, the electric assist bicycle switches from the unlocking state to the locking state. Locking the electric assist bicycle manually is not needed, thus a losing of the electric assist bicycle and a usage of the electric assist bicycle by the user who is not authorized are avoided, therefore the safety hazard situation can be decreased.

In some embodiments, before the step S101, the method can include:

Step S401, obtaining identification information of a user transmitted by a BLE unit of the electric assist bicycle, and authenticating whether the user is the target user according to the identification information.

The user needs to carry the device supporting the UWB, to cause the electric assist bicycle to switch from the unlocking state to the locking state. Each device supporting the UWB corresponds to one carrier. Thus, the method can determine whether the carrier is the target user via obtaining the identification information. The identification information includes information of the electric assist bicycle and the password generated between the electric assist bicycle and the device supporting the UWB. It can be understood that, the identification information can be other information, the disclosure is not limited herein. The information of the electric assist bicycle can be a model of the electric assist bicycle, and so on. The electric assist bicycle can include the BLE unit to authenticate the user identification. The BLE unit can be integrated into the control device 2.

For example, an identification authentication between the control device 2 and the device 1 supporting the UWB can include, firstly, the control device 2 and the device1 supporting the UWB each includes the BLE unit, the control device 2 and the device 1 supporting the UWB establish a Bluetooth connection. When the control device 2 detects that the device 1 supporting the UWB enters into the region that can receive the Bluetooth broadcasting by the control device 2, the control device 2 exchanges the identification information with the device 1 supporting the UWB, and binds the identification information of the device 1 supporting the UWB to complete the identification authentication between the control device 2 and the device 1 supporting the UWB. When the device 1 supporting the UWB enters into the region that can receive the Bluetooth broadcasting by the control device 2 again, the control device 2 does not need to bind the identification information with the device 1 supporting the UWB again, the control device 2 can directly determine that the user carrying the device 1 supporting the UWB is the target user. It can be understood that, during exchanging the identification information and binding the identification information of the device 1 supporting the UWB, the password between the electric assist bicycle and the device 1 supporting the UWB can be generated.

Step S402, waking the UWB unit of the electric assist bicycle if the control device authenticates the user to be the target user.

In some embodiments, the control device 2 wakes the UWB unit of the electric assist bicycle, to cause the UWB unit to determine the position information of the target user.

It can be understood that, the control device 2 can utilize the UWB unit to combine with the BLE unit, to automatic determine the position information of the target user after performing the identification authentication of the target user of the electric assist bicycle. Because the BLE is a low electric consumption technology, thus the method can extend a battery life, and the UWB unit will be waked when needed, thus the method can obtain the position information timely, and avoid the electric consumption of the UWB unit when the UWB unit is waked at any moment, thus a bad user experience can be avoided.

Figure 3:
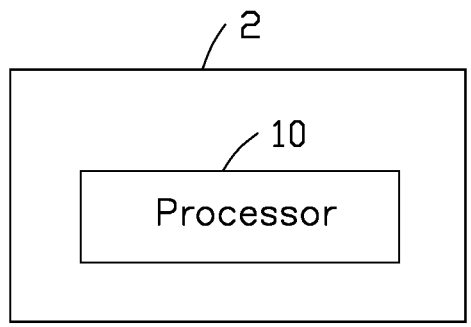
FIG. 3 is a block diagram of an embodiment of a control system of electric assist bicycle.

Referring to FIG. 3, a control system of the electric assist bicycle is shown. The control system 100 includes the control device 2. The control device 2 includes a processor 10. The processor 10 can be a MCU (Microcontroller Unit) or a CPU (Central Process Unit). The processor 10 is configured to obtain the position information of the target user. In some embodiment, the processor 10 is configured to obtain the position information of the target user transmitted by the UWB unit of the electric assist bicycle. The processor 10 is further configured to generate the state switching instruction according to the position information, and controls the electric assist bicycle to switch from the unlocking state to the locking state or from the locking state to the unlocking state according to the state switching instruction. The processor 10 is further configured to generate the unlocking instruction when the distance between the target user and the electric assist bicycle is within the preset range, and control the function control units of the electric assist bicycle to be waked according to the unlocking instruction, to cause the electric assist bicycle to switch from the locking state to the unlocking state. The processor 10 is further configured to generate the locking instruction when the distance between the target user and the electric assist bicycle is out of the preset range, and control the function control units of the electric assist bicycle to be in the standby state or the shutdown state according to the locking instruction, to cause the electric assist bicycle to switch from the unlocking state to the locking state. The processor 10 is further configured to obtain identification information of a user transmitted by the BLE unit of the electric assist bicycle, authenticates whether the user is the target user according to the identification information, and wakes the UWB unit of the electric assist bicycle if the user is authenticated to be the target user.

Namely, the processor 10 of the control device 2 is configured to perform a part of or a whole of the steps of the method of the embodiment. The detail can refer to the related description of the method of controlling state of electric assist bicycle, which will not be described herein. Simultaneously, the processor 10 can further generate corresponding function control instructions in response to user operations, and perform various functions of the electric assist bicycle according to the function control instructions.

Figure 4:
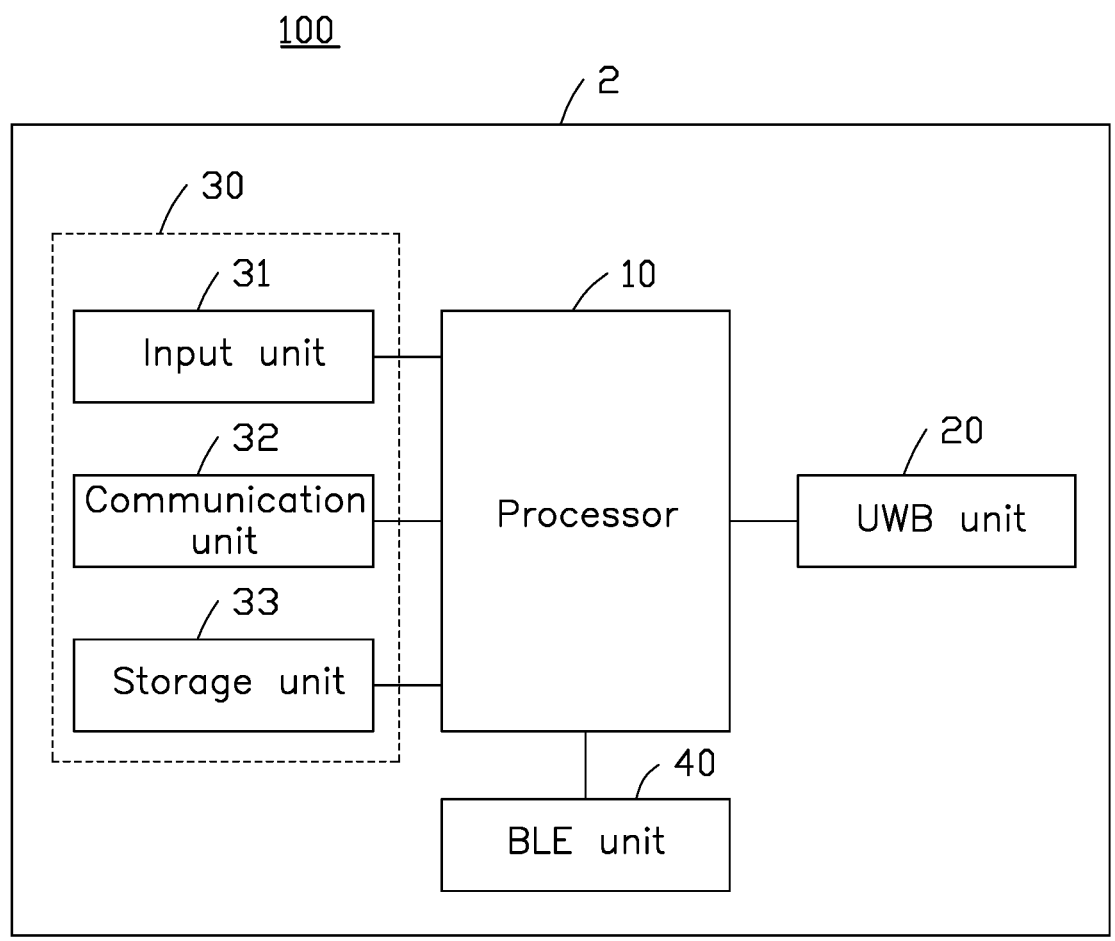
FIG. 4 is a block diagram of another embodiment of a control system of electric assist bicycle.

Referring to FIG. 4, in some embodiments, the control device 2 further includes a positioning unit. The positioning unit can be a UWB unit 20. The UWB unit 20 is electrically coupled to the processor 10. The UWB unit 20 can include a device integrated by a UWB chip and an antenna. The UWB unit 20 can further include a RFIC (Radio Frequency Integrated Circuit). Where the RFIC can be integrated by the UWB chip and the module having a RF (Radio Frequency) function. For example, the RFIC can be integrated by the UWB chip and a Wi-Fi wireless module. Or for example, the RFIC can be integrated by the UWB chip and a Bluetooth wireless module.

The UWB unit 20 is configured to measure the position information of the target user via the ToF, and transmit the position information to the processor 10.

In some embodiments, the control device 2 further includes a BLE unit 40. The BLE unit 40 is electrically coupled to the processor 10. The BLE unit 40 is configured to obtain the identification information of the user, and transmit the identification information to the processor 10, to cause the processor 10 to authenticate the identification of the device 1 supporting the UWB carried by the target user.

In some embodiments, the control device 2 further includes some units of the function control units 30 of the electric assist bicycle, for example the input unit 31, the communication unit 32, and the storage unit 33. The communication unit 32 is electrically coupled to the processor 10. The communication unit 32 can be a wireless communication unit. The wireless communication unit can be, for example a Bluetooth unit, a ZigBee Technology module, an ANT+(advanced network tools), a UWB (Ultra Wide Band) module, and a NFC (Near Field Communication) module. The communication unit 32 can further be a CAN Bus (Controller Area Network Bus), which employs the physical wire to couple an interface of the control device 2 to interfaces of the other function control units of the electric assist bicycle. The other function control units can be, for example the display terminal or the power control unit. The communication unit 32 is configured to receive a first signal from the processor 10, and transmit the first signal to the other function control units external to the control device 2. Simultaneously, the communication unit 32 is further configured to receive a second signal from the other function element, and transmit the second signal to the processor 10.

The input unit 31 is electrically coupled to the processor 10. The input unit 31 can include one or more physical buttons and/or a touch panel. Each button can be a resistive button, a capacitive button, an electromagnetic button, an optical button, or the like. The user can operate the physical buttons and/or virtual buttons of the touch panel to achieve a function of adjusting the size of the assist power of the electric assist bicycle, and the other functions of the electric assist bicycle. The other functions of the electric assist bicycle can include adjusting the light mode of the vehicle lamp, switching the interface on the display terminal of the electric assist bicycle, adjusting the range of the transmission, and so on. The display terminal can be a mobile terminal or a cycle computer display.

The storage unit 33 is electrically coupled to the processor 10. The storage unit 33 can be a RAM (Random Access Memory), a ROM (Read-Only Memory), a Flash (Flash EEPROM Memory), or the like. The storage unit 33 can store relation information of the electric assist bicycle, for example the model of the electric assist bicycle, which can be read by the processor 10.

Figure 5:
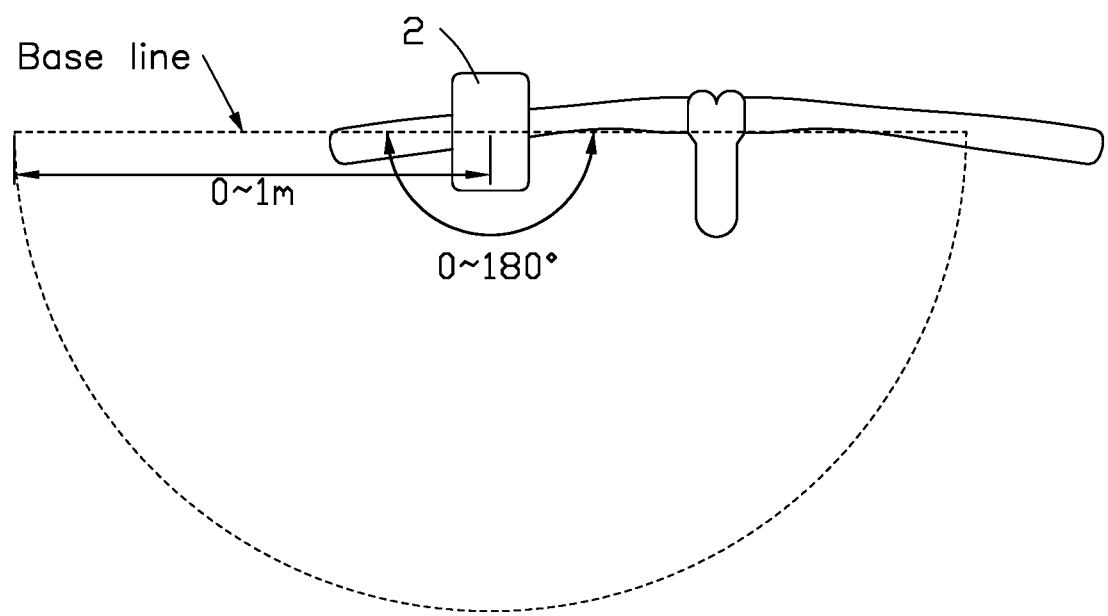
FIG. 5 is an application scenario view of an embodiment of a control system of electric assist bicycle.
Figure 6:
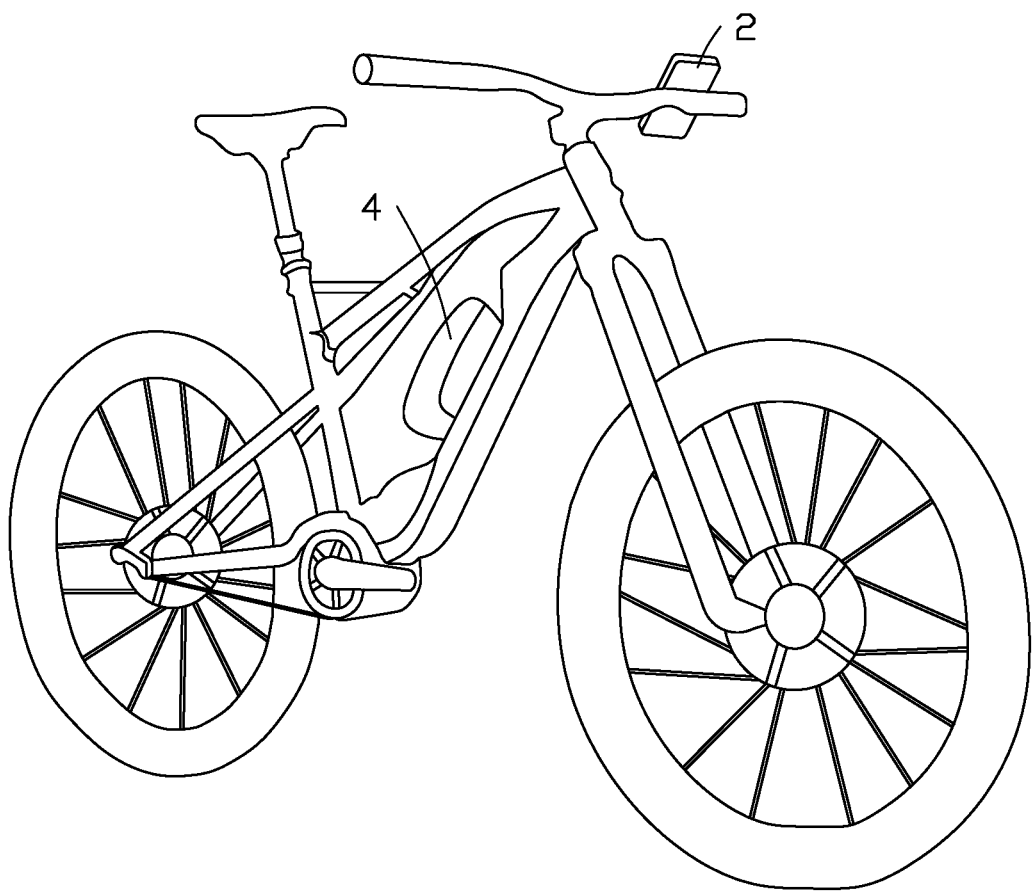
FIG. 6 is an application scenario view of another embodiment of a control system of electric assist bicycle.

In some embodiments, referring to FIG. 5, the control device 2 is installed on a handlebar of the electric assist bicycle. The control device 2 can be installed on a left handlebar or a right handlebar. A detection range of the UWB unit 20 of the control device 2 is the range rotated anticlockwise 0 degrees to 180 degrees about the base line, and a distance between the target user and the UWB unit 20 of the control device 2 being 0~1 m. In an application scenario, when the target user approaches the electric assist bicycle, the processor 10 of the control device 2 of the electric assist bicycle can determine that the target user is within the detection range according to the position information transmitted by the UWB unit 20, the processor 10 of the control device 2 generates the unlocking instruction. The processor 10 further transmits the unlocking instruction to the function control units 30 of the control device 2, for example, the processor 10 transmits the unlocking instruction to the input unit 31, the communication unit 32, and the storage unit 33. The processor 10 further transmits the unlocking instruction to the other function control units 30 external to the control device 2, for example, the processor 10 transmits the unlocking instruction to the power control unit, the vehicle lamp, and so on. Thus, the processor 10 of the control device 2 can control the input unit 31, the communication unit 32, the storage unit 33, the power control unit, and the vehicle lamp to be in the waking state. In some embodiments, referring to FIG. 6, the processor 10 of the control device 2 generates the unlocking instruction, and transmits the unlocking instruction to the power control unit via the physical wire, the power control unit can be accordingly waked. After the power control unit is waked, the power control unit can control the motor and the current sensor of the motor to be waked. It can be understood that, the processor 10 of the control device 2 can generate the unlocking instruction and transmit the unlocking instruction to the power control unit via the wireless link, the disclosure is not limited herein.

When the target user moves away from the electric assist bicycle, the processor 10 of the control device 2 of the electric assist bicycle can determine that the target user is out of the detection range according to the position information transmitted by the UWB unit 20, the processor 10 of the control device 2 further generates the locking instruction. The processor 10 further transmits the locking instruction to the function control units 30 of the control device 2, for example, the processor 10 transmits the locking instruction to the input unit 31, the communication unit 32, and the storage unit 33. The processor 10 further transmits the locking instruction to the other function control units 30 external to the control device 2, for example, the processor 10 transmits the locking instruction to the power control unit, the vehicle lamp, and so on. Thus, the processor 10 of the control device 2 can control the input unit 31, the communication unit 32, the storage unit 33, the power control unit, and the vehicle lamp to be in the standby state or in the shutdown state. After the processor 10 of the control device 2 generates the locking instruction and transmits the locking instruction to the power control unit via the physical wire, the power control unit can control the motor and the current sensor of the motor to be in the standby state or in the shutdown state, and then can enter into the standby state or into the shutdown state.

Figure 7:
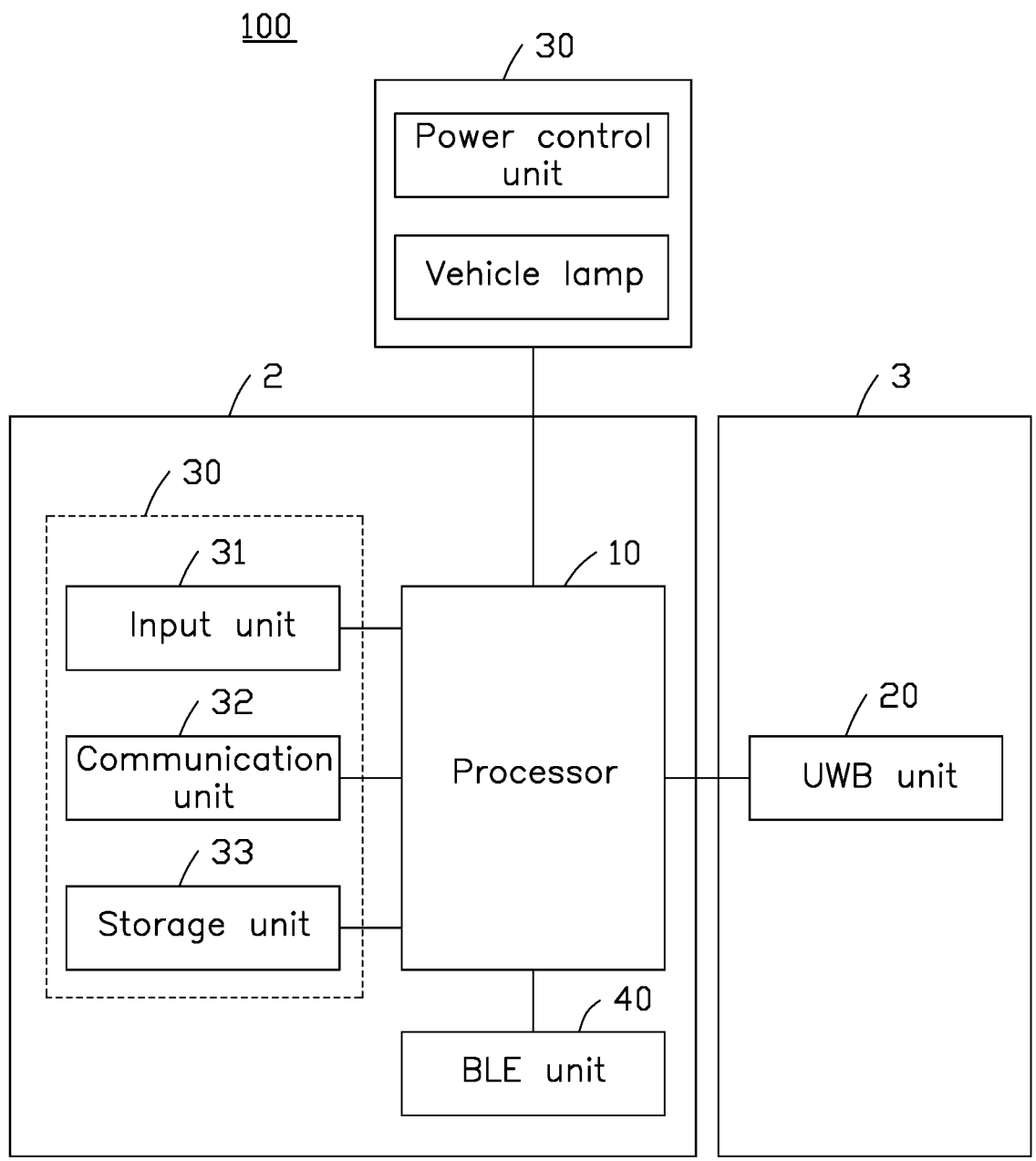
FIG. 7 is a block diagram of an embodiment of a control system of electric assist bicycle.

In some embodiments, referring to FIG. 7, the control system 100 further includes the cycle computer display 3. The UWB unit 20 is integrated into the cycle computer display 3. The cycle computer display 3 is installed in the center between the left handlebar and the right handlebar. The processor 10 and the subunits of the control device 2 can be integrated into the control device 2. The subunits of the control device 2 includes the input unit 31, the communication unit 32, and the storage unit 33. The UWB unit 20 of the cycle computer display 3 is electrically coupled to the processor 10 of the control device 2.

Figure 8:
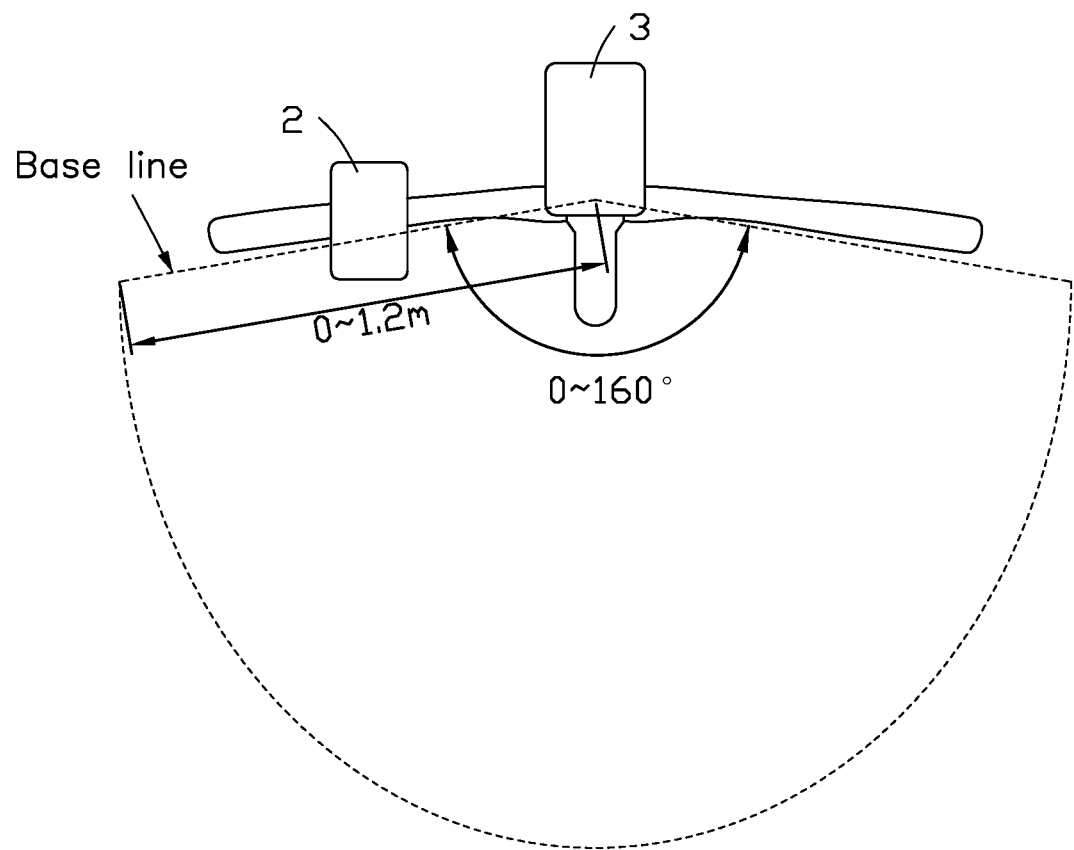
FIG. 8 is an application scenario view of another embodiment of control system of electric assist bicycle.
Figure 9:
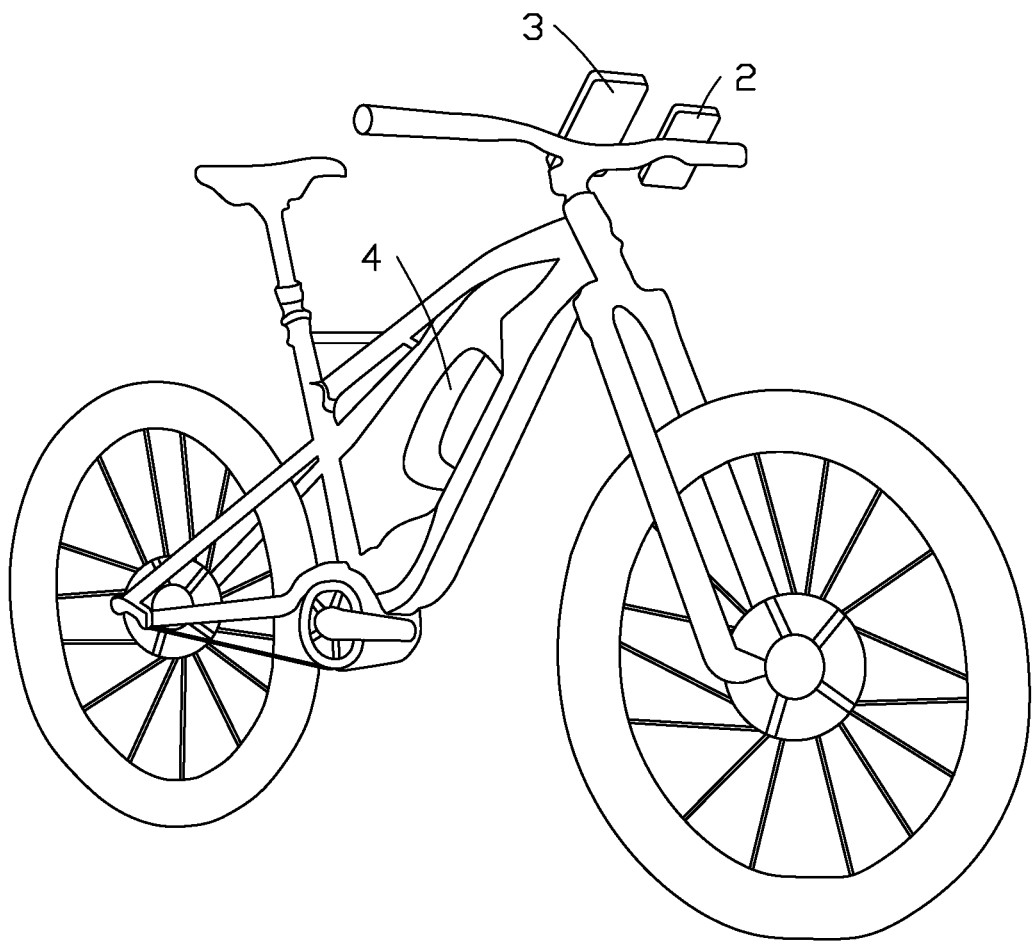
FIG. 9 is an application scenario view of another embodiment of a control system of electric assist bicycle.

In some embodiments, referring to FIG. 8, in an application scenario, a detection range of the UWB unit 20 of the cycle computer display 3 is the range rotated anticlockwise 0 degrees to 160 degrees about the base line, and a distance between the target user and the UWB unit 20 of the cycle computer display 3 being 0~1.2 m. When the target user approaches the electric assist bicycle, and the processor 10 of the control device 2 of the electric assist bicycle determine that the target user is within the detection range according to the position information transmitted by the UWB unit 20 of the cycle computer display 3, the processor 10 of the control device 2 generates the unlocking instruction. The processor 10 further transmits the unlocking instruction to the function control units 30 of the control device 2, for example, the processor 10 transmits the unlocking instruction to the input unit 31, the communication unit 32, and the storage unit 33. The processor 10 further transmits the unlocking instruction to the other function control units 30 external to the control device 2, for example, the processor 10 transmits the unlocking instruction to the power control unit, the vehicle lamp, and so on. Thus, the processor 10 of the control device 2 can control the input unit 31, the communication unit 32, the storage unit 33, the power control unit, and the vehicle lamp to be in the waking state. Referring to FIG. 9, the UWB unit 20 of the cycle computer display 3 transmits the position information to the processor 10 of the control device 2 via the physical wire, the processor 10 of the control device 2 generates the unlocking instruction. After the processor 10 of the control device 2 transmits the unlocking instruction to the power control unit 4 via the physical wire, the power control unit 4 can be waked. After the power control unit 4 is waked, the power control unit 4 can control the motor and the current sensor of the motor to be in the waking state.

When the target user moves away from the electric assist bicycle, the processor 10 of the control device 2 of the electric assist bicycle can determine that the target user is out of the detection range according to the position information transmitted by the UWB unit 20, the processor 10 of the control device 2 further generates the locking instruction. The processor 10 further transmits the locking instruction to the function control units 30 of the control device 2, for example, the processor 10 transmits the locking instruction to the input unit 31, the communication unit 32, and the storage unit 33. The processor 10 further transmits the locking instruction to the other function control units 30 external to the control device 2, for example, the processor 10 transmits the locking instruction to the power control unit 4, the vehicle lamp, and so on. Thus, the processor 10 of the control device 2 can control the input unit 31, the communication unit 32, the storage unit 33, the power control unit 4, and the vehicle lamp to be in the standby state or in the shutdown state. Where, the UWB unit 20 of the cycle computer display 3 transmits the position information to the processor 10 of the control device 2 via the physical wire, after the processor 10 of the control device 2 generates the locking instruction and transmits the locking instruction to the power control unit 4 via the physical wire, the power control unit 4 can control the motor and the current sensor of the motor to be in the standby state or in the shutdown state, and then can enter into the standby state or into the shutdown state.

It can be understood that, the UWB unit 20 can be integrated into the control device 2 or the cycle computer display 3. The control device 2 and/or the cycle computer display 3 each is installed to the handlebar. The obstacles on the handlebar are less. Thus, the control device 2 and/or the cycle computer display 3 each is not easy to be interfered by the one or more obstacles when the control device 2 and/or the cycle computer display 3 each receives the signal transmitted by the device supporting the UWB. The UWB unit 20 can calculate a more accurate position information of the target user.

Figure 10:
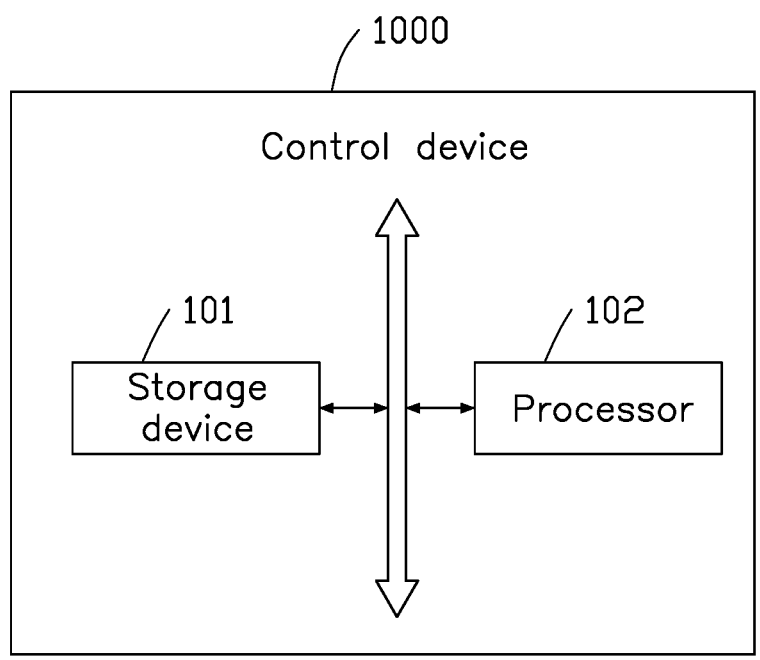
FIG. 10 is a block diagram of an embodiment of a control device.

Referring to FIG. 10, a block diagram of a control device is shown. In some embodiments, the control device 1000 includes a storage device 101 and at least one processor 102. Those skilled in the art should understand that the structure of the control device 1000 shown in FIG. 10 does not constitute a limitation of the embodiment of the present disclosure. The control device 1000 may also include more or less other hardware or software than shown, or have different component arrangements.

In some embodiments, the control device 1000 includes a terminal that can automatically perform numerical calculation and/or information processing according to pre-set or stored instructions, and its hardware includes, but is not limited to, a microprocessor and an application specific integrated circuit, programmable gate arrays, digital processors and embedded devices, etc. In some embodiments, the storage device 101 may be used to store program codes and various data of computer programs. The storage device 101 may include Read-Only Memory (ROM), Programmable Read-Only Memory (PROM), and Erasable Programmable Read-Only Memory. EPROM), One-time Programmable Read-Only Memory (OTPROM), Electronically-Erasable Programmable Read-Only Memory (EEPROM), Compact Disc (Compact Disc) Read-Only Memory (CD-ROM) or other optical disk storage, disk storage, magnetic tape storage, or any other non-transitory computer-readable storage medium that can be used to carry or store data.

In some embodiments, the at least one processor 102 may be composed of an integrated circuit. For example, the at least one processor 102 can be composed of a single packaged integrated circuit or can be composed of multiple packaged integrated circuits with the same function or different function. The at least one processor 102 includes one or more microprocessors, one or more digital processing chips, one or more graphics processors, and various control chips. The at least one processor 102 is a control center of the control device, and performs various functions of the network device and/or processes data by running or executing a software program and/or module stored in the storage device 101 and invoking data stored in the storage device 101. When the foregoing integrated module is implemented in a form of a software functional module, the integrated module may be stored in a computer-readable storage medium. The software functional module is stored in a storage medium and includes several instructions for instructing a computer device (which may be a personal computer, a server, a network device, or the like) or a processor to perform some of the steps of the methods described in the embodiments of this application. The storage device 101 stores program code, and the at least one processor 102 is configured to invoke the program code stored in the storage device 101 to perform the relation function. In some embodiments, the storage device 101 stores a number of program codes. The program codes can be performed by the at least one processor 102 to perform a method of controlling state of electric assist bicycle. A detail of the at least one processor 102 performing the program codes can refer to the related description of the steps of the method of FIG. 1, which will not be described herein.

An embodiment of this application further provides a storage medium. The storage medium stores a computer program code. When the computer program code is run on a control device, the control device is enabled to perform the method of controlling state of electric assist bicycle.

A person of ordinary skill in the art may be aware that, in combination with the examples described in the embodiments disclosed in this specification, units and algorithm steps can be implemented by electronic hardware or a combination of computer software and electronic hardware. Whether the functions are performed by the hardware or the software depends on particular applications and design constraint conditions of the technical solutions. A person skilled in the art may use different methods to implement the described functions for each particular application, but it should not be considered that the implementation goes beyond the scope of this application. A person skilled in the art may clearly understand that, for the purpose of convenient and brief description, for a detailed working process of the system and apparatus described above, refer to a corresponding process in the foregoing method embodiments, and details are not described herein again. In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms. The units described as separate parts may or may not be physically separate, and parts displayed as units may or may not be physical units, may be located in one location, or may be distributed on a plurality of network units. Some or all of the units may be selected based on an actual requirement to achieve the objectives of the solutions in the embodiments. In addition, functional units in the embodiments of this application may be integrated into one processing unit, or each of the units may exist alone physically, or two or more units are integrated into one unit. It should be noted that, the above are only preferred embodiments and applied technical principles of the present disclosure. Those skilled in the art should understand that, the present disclosure is not limited to the specific embodiments described herein, and various obvious changes, readjustments and substitutions that are made by those skilled in the art will not depart from the scope of the present disclosure. Therefore, although the present disclosure has been described in detail by the above embodiments, the present disclosure is not limited to the above embodiments, and more other equivalent embodiments may be included without departing from the concept of the present disclosure, and the scope of the present disclosure is determined by the scope of the appended claims.

What is claimed is:

1. A method of controlling state of electric assist bicycle comprising:
   obtaining position information of a target user;
   generating a state switching instruction according to the position information of the target user; and
   controlling the electric assist bicycle to switch from an unlocking state to a locking state according to the state switching instruction, or controlling the electric assist bicycle to switch from the locking state to the unlocking state according to the state switching instruction;
   wherein the obtaining the position information of the target user further comprises:
   obtaining identification information of a user transmitted by a Bluetooth® Low Energy unit of the electric assist bicycle;
   authenticating whether the user is the target user according to the identification information;
   waking an Ultra Wide Band (UWB) unit of the electric assist bicycle if the user is authenticated to be the target user; and
   obtaining the position information of the target user transmitted by the UWB unit of the electric assist bicycle;

wherein the position information presents that a distance between the target user and the UWB unit of the electric assist bicycle is within a first present range, and an orientation of the target user relative to the electric assist bicycle is within a second preset range; the second preset range is, with a preset certain orientation of the UWB unit as a base line, a range rotated clockwise or anticlockwise about the base line from 0 degrees to 160 degrees.

2. The method according to claim 1, wherein the position information is provided with a distance between the target user and the electric assist bicycle, generating the state switching instruction further comprises:
   generating an unlocking instruction when the distance between the target user and the electric assist bicycle is within a preset range;
   generating a locking instruction when the distance between the target user and the electric assist bicycle is out of the preset range.

3. The method according to claim 2, wherein controlling the electric assist bicycle to switch from the unlocking state to the locking state according to the state switching instruction further comprises:
   controlling one or more function control units of the electric assist bicycle to switch from a waking state to be in a standby state or a shutdown state according to the locking instruction, to cause the electric assist bicycle to switch from the unlocking state to the locking state.

4. The method according to claim 2, wherein controlling the electric assist bicycle to switch from the locking state to the unlocking state according to the state switching instruction further comprises:
   controlling one or more function control units of the electric assist bicycle to switch from a standby state or a shutdown state to be in a waking state according to the unlocking instruction, to cause the electric assist bicycle to switch from the locking state to the unlocking state.

5. The method according to claim 1, wherein the position information is provided with a distance between the target user and the electric assist bicycle and an orientation of the target user relative to the electric assist bicycle, generating the state switching instruction further comprises:
   generating an unlocking instruction when the distance between the target user and the electric assist bicycle and the orientation of the target user relative to the electric assist bicycle are within a preset range;
   generating a locking instruction when the distance between the target user and the electric assist bicycle and the orientation of the target user relative to the electric assist bicycle are out of the preset range.

6. A control device comprising:
   a storage device;
   at least one processor; and
   the storage device storing one or more programs, which when executed by the at least one processor, cause the at least one processor to:
   obtain position information of a target user;
   generate a state switching instruction according to the position information of the target user; and
   control the electric assist bicycle to switch from an unlocking state to a locking state according to the state switching instruction or controlling the electric assist bicycle to switch from the locking state to the unlocking state according to the state switching instruction;
   wherein the one or more programs being executed by the at least one processor, which causes the at least one processor to:
   obtain identification information of a user transmitted by a Bluetooth® Low Energy unit of the electric assist bicycle;
   wake the Ultra Wide Band unit of the electric assist bicycle if the user is authenticated to be the target user; and
   obtain the position information of the target user transmitted by an Ultra Wide Band unit of the electric assist bicycle;
   wherein the position information presents that a distance between the target user and the UWB unit of the electric assist bicycle is within a first present range, and an orientation of the target user relative to the electric assist bicycle is within a second preset range; the second preset range is, with a preset certain orientation of the UWB unit as a base line, a range rotated clockwise or anticlockwise about the base line from 0 degrees to 160 degrees.

7. The control device according to claim 6, wherein the position information comprises a distance between the target user and the electric assist bicycle, further causes the at least one processor to:
   generate an unlocking instruction when the distance between the target user and the electric assist bicycle is within a preset range;
   generate a locking instruction when the distance between the target user and the electric assist bicycle is out of the preset range.

8. The control device according to claim 7, further causing the at least one processor to:
   control one or more function control units of the electric assist bicycle to switch from a waking state to be in a standby state or a shutdown state according to the locking instruction, to cause the electric assist bicycle to switch from the unlocking state to the locking state.

9. The control device according to claim 7, further causing the at least one processor to:
   control one or more function control units of the electric assist bicycle to switch from a standby state or a shutdown state to be in a waking state according to the unlocking instruction, to cause the electric assist bicycle to switch from the locking state to the unlocking state.

10. A control system comprising a control device, the control device comprising:
   a storage device;
   at least one processor; and
   the storage device storing one or more programs, which when executed by the at least one processor, cause the at least one processor to:
   obtain position information of a target user;
   generate a state switching instruction according to the position information of the target user; and
   control the electric assist bicycle to switch from an unlocking state to a locking state according to the state switching instruction or controlling the electric assist bicycle to switch from the locking state to the unlocking state according to the state switching instruction;
   wherein the control device further causes the at least one processor to:
   obtain identification information of a user transmitted by a Bluetooth® Low Energy unit of the electric assist bicycle;

wake the Ultra Wide Band unit of the electric assist bicycle if the user is authenticated to be the target user; and obtain the position information of the target user transmitted by an Ultra Wide Band unit of the electric assist bicycle;

wherein the position information presents that a distance between the target user and the UWB unit of the electric assist bicycle is within a first present range, and an orientation of the target user relative to the electric assist bicycle is within a second preset range; the second preset range is, with a preset certain orientation of the UWB unit as a base line, a range rotated clockwise or anticlockwise about the base line from 0 degrees to 160 degrees.

11. The control system according to claim 10, wherein the position information comprises a distance between the target user and the electric assist bicycle, the control device further causes the at least one processor to:

generate an unlocking instruction when the distance between the target user and the electric assist bicycle is within a preset range;

generate a locking instruction when the distance between the target user and the electric assist bicycle is out of the preset range.

12. The control system according to claim 11, wherein the control device further causes the at least one processor to:

control one or more function control units of the electric assist bicycle to switch from a waking state to be in a standby state or a shutdown state according to the locking instruction, to cause the electric assist bicycle to switch from the unlocking state to the locking state.

13. The control system according to claim 11, wherein the control device further causes the at least one processor to:

control one or more function control units of the electric assist bicycle to switch from a standby state or a shutdown state to be in a waking state according to the unlocking instruction, to cause the electric assist bicycle to switch from the locking state to the unlocking state.

14. The control system according to claim 10, further comprises:

a cycle computer display, which is configured to determine the position information of the target user, and transmit the position information of the target user to the control device; wherein the cycle computer display and/or the control device is installed on a handlebar of the electric assist bicycle.

* * * * *